J. S. COE.
Bee-Hive.

No. 159,081. Patented Jan. 26, 1875.

WITNESSES:

INVENTOR:
J. S. Coe
BY
ATTORNEYS.

UNITED STATES PATENT OFFICE.

JULIUS S. COE, OF MONT CLAIR, NEW JERSEY.

IMPROVEMENT IN BEE-HIVES.

Specification forming part of Letters Patent No. 159,081, dated January 26, 1875; application filed September 19, 1874.

*To all whom it may concern:*

Be it known that I, JULIUS S. COE, of Mont Clair, in the county of Essex and State of New Jersey, have invented a new and useful Improvement in Bee-Houses, of which the following is a specification:

The invention will first be fully described, and then pointed out in the claim.

Figure 1:
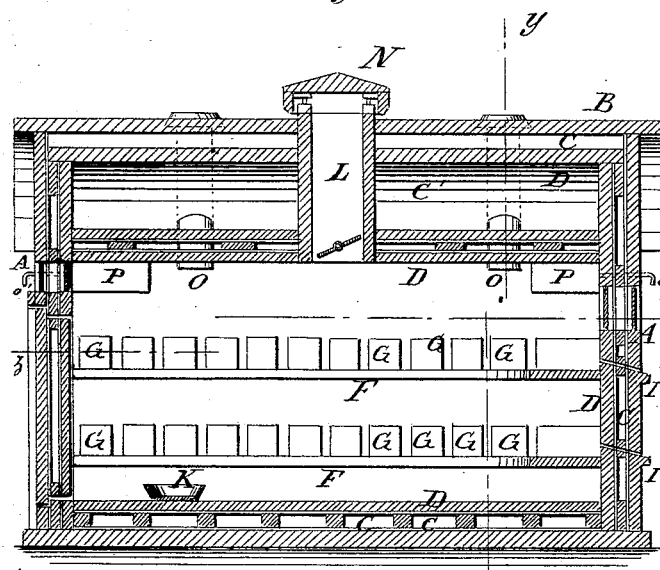
Figure 2:
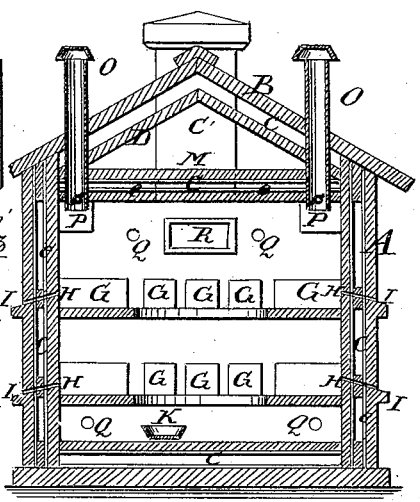
Figure 3:
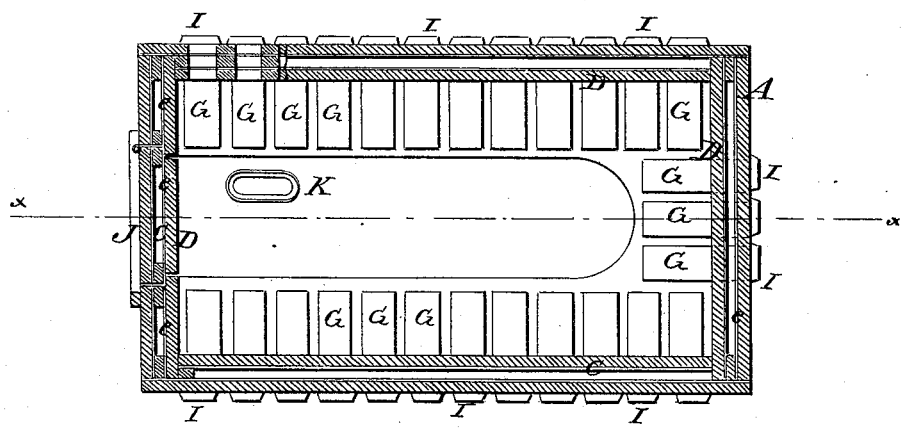

In the accompanying drawing, Figure 1 is a sectional elevation of the bee-house, taken on the line $x$ $x$ of Fig. 3. Fig. 2 is a vertical cross-section of the house, taken on the line $y$ $y$ of Fig. 1. Fig. 3 is a horizontal section of Fig. 1, taken on the line $z$ $z$.

Similar letters of reference indicate corresponding parts.

The walls, roof, and ceiling, and lower floors of this bee-house are made double, of wood or other suitable materials, each having an inclosed space, C, between the outer wall, A, and roof B and the inner wall or lining, D. This space C may be filled with any good non-conductor of heat, or be left as dead-air spaces. The interior surfaces of these spaces are covered with building-paper of any description, to insure tight joints. $e$ represents paper.

Other air-tight material may be used; but the manila building-paper is preferred, as all the cracks and pores of the wood are entirely closed thereby, and consequently all air-passages are stopped.

The paper is cemented upon both surfaces of the spaces $c$, and effectually prevents the warping of the wall when properly cemented thereto.

Between the double ceiling and the double roof is dead-air space $c'$. This air-space, in combination with the double roof and ceiling, counteracts the effects of the sun in hot weather, and effectually screens the hives.

In times of excessive heat, the cold-air ducts $o'$ may be connected with an ice-house to more effectually cool the bee-house.

At all seasons of the year more or less animal heat is generated by the bees. This heat is utilized in this bee-house in winter-time by producing (in combination with the fresh-air pipes, exit-pipes, and sealed walls) a gentle circulation of air, by which the health and activity of the bees are secured.

The cold air which passes down through the ventilating-tubes in hot weather falls by its greater specific gravity upon and around the hives, and serves to keep them cool on the outside, and prevents the stupefying effect of heat within the hive.

The atmosphere within the bee-house in extreme hot weather may be cooled by the evaporation of water from pans or other proper receptacles (one or more) placed on the floor, or located wherever convenient; or pieces of cloth may be saturated with water, and suspended in the bee-house for that purpose.

K is an evaporating-pan. F are shelves, (two, more or less,) on which the bee-hives G are placed. The hives are arranged in rows on each side of the house and across one end, as represented in Fig. 3, and the bees obtain access to them through the apertures H from the alighting-boards I, each hive having a separate entrance, as seen. J is the door for giving access to the hives, above which is a fan-light or window for lighting the interior of the house. This door is also double, as represented. L is a central flue for the discharge of the foul or heated air of the bee-house. This flue extends down through the double ceiling $m$, and is sufficiently large to allow of a free passage of air from the hive-apartment. This flue extends up through the roof a suitable distance, and is covered by the cap N. L$'$ is a damper. O are flues for the admission of pure air. These flues protrude through the roof, and extend down near each of the side walls of the bee-house. Revolving hoods or other suitable devices may be attached to these flues for concentrating and directing the air downward into the house. These flues and air-tubes are all provided with dampers, as seen in the drawing. P are ice-boxes, (four, more or less,) which are placed in any convenient location for cooling the bee-house when the temperature rises too high. Q are holes through the ends of the house for the introduction of cool air when necessary. These holes are provided with adjustable valves and dampers. R is a window, which may be inserted for affording additional light to the bee-house.

A bee-house constructed and arranged in this manner may be kept at any desired temperature in the hottest weather, and protected from cold in the coldest weather—advantages which the ordinary bee-house does not possess.

I do not broadly claim a bee-house made with double walls; but,

Having thus described my invention, I claim as new and desire to secure by Letters Patent—

The combination, with a bisected close bee-house, of side shelves arranged around an open space in tiers, the air-inlet pipes O, and the air-discharge flue L, as shown and described.

JULIUS S. COE.

Witnesses:
N. O. PILLSBURY,
HUGH GALLAGHER.